US012770406B2

(12) United States Patent
Kim et al.

(10) Patent No.: US 12,770,406 B2
(45) Date of Patent: Oct. 20, 2026

(54) APPARATUS AND METHOD FOR DETERMINING A POSITION OF AN OBJECT OUTSIDE A VEHICLE

(71) Applicants: HYUNDAI MOTOR COMPANY, Seoul (KR); KIA CORPORATION, Seoul (KR)

(72) Inventors: Seul Gi Kim, Seoul (KR); Min Sung Son, Gwacheon-si (KR); Ra Hoon Kang, Seoul (KR); Ha Yong Woo, Gwangmyeong-si (KR); Dong Yeoup Jeon, Seoul (KR)

(73) Assignees: HYUNDAI COMPANY, Seoul (KR); KIA CORPORATION, Seoul (KR)

( * ) Notice: Subject to any disclaimer, the term of this patent is extended or adjusted under 35 U.S.C. 154(b) by 344 days.

(21) Appl. No.: 18/538,586

(22) Filed: Dec. 13, 2023

(65) Prior Publication Data

US 2024/0404298 A1 Dec. 5, 2024

(30) Foreign Application Priority Data

Jun. 1, 2023 (KR) ........................ 10-2023-0071042

(51) Int. Cl.
*G06V 20/58* (2022.01)
*B60W 60/00* (2020.01)

(52) U.S. Cl.
CPC ........... *G06V 20/58* (2022.01); *B60W 60/001* (2020.02); *B60W 2420/403* (2013.01); *B60W 2554/4049* (2020.02)

(58) Field of Classification Search
None
See application file for complete search history.

(56) References Cited

U.S. PATENT DOCUMENTS

2018/0211394 A1* 7/2018 Sergeev .................... G06T 7/20
2021/0109543 A1* 4/2021 Hiromitsu ............ G06V 10/451

* cited by examiner

*Primary Examiner* — Lennin R Rodriguezgonzalez
(74) *Attorney, Agent, or Firm* — Lempia Summerfield Katz LLC

(57) ABSTRACT

An apparatus for determining a position of an object outside a vehicle includes: a camera that obtains an external image of the vehicle, and a processor that may detect a target region corresponding to a target object in the external image. In particular, the processor detects a predetermined horizontal reference line in the target region, calculates a gradient of the horizontal reference line perpendicular to a front direction of the vehicle on a horizontal plane parallel to a road surface, and calculates a heading angle difference between the vehicle and the target object based on the gradient of the horizontal reference line.

20 Claims, 14 Drawing Sheets

APPARATUS AND METHOD FOR DETERMINING A POSITION OF AN OBJECT OUTSIDE A VEHICLE

CROSS-REFERENCE TO RELATED APPLICATION

This application claims the benefit of and priority to Korean Patent Application No. 10-2023-0071042, filed in the Korean Intellectual Property Office on Jun. 1, 2023, the entire contents of which are incorporated herein by reference.

TECHNICAL FIELD

The present disclosure relates to an apparatus and method for determining the position of an object outside a vehicle, and more particularly, to a technique for determining the position of a preceding vehicle.

BACKGROUND

The statements in this section merely provide background information related to the present disclosure and may not constitute prior art.

An autonomous vehicle, often referred to as a self-driving or driverless vehicle, is a type of vehicle that is capable of operating and navigating without direct input or intervention of a driver or passenger. An automated vehicle & highway system refers to a system that monitors and controls an autonomous vehicle in such a way that the autonomous vehicle is capable of driving itself. In addition, technologies for monitoring the outside of a vehicle and operating various driving assistance means based on the monitored external environment of the vehicle have been proposed to assist the driver in driving.

An autonomous vehicle or a vehicle equipped with driving assistance devices may monitor the outside of the vehicle to detect an object and control the vehicle based on a scenario determined according to the detected object.

A scenario for controlling a vehicle generally considers only the position of an object detected outside the vehicle.

However, there is a limit in accurately determining the state of an object simply with the position of the object.

SUMMARY

The present disclosure has been made to solve the above-mentioned problems occurring in the prior art while advantages achieved by the prior art are maintained intact.

An aspect of the present disclosure provides an apparatus and method for determining a position of an object, which are capable of more accurately determining a state of an object.

An aspect of the present disclosure provides an apparatus and method for determining a position of an object, which are capable of accurately performing vehicle control by more accurately determining the driving intention of a target object (e.g., a target vehicle).

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, an apparatus for determining a position of an object outside a vehicle may include: a camera that obtains an external image of the vehicle, and a processor that detects a target region corresponding to a target object in the external image. In particular, the processor may detect a predetermined horizontal reference line in the target region, calculate a gradient of the horizontal reference line perpendicular to a front direction of the vehicle on a horizontal plane parallel to a road surface, and calculate a heading angle difference between the vehicle and the target object based on the gradient of the horizontal reference line.

According to an embodiment, the processor may detect the horizontal reference line perpendicular to a front direction of the target object.

According to an embodiment, the processor may determine a first reference point and a second reference point on the horizontal reference line, the first reference point and the second reference point being randomly determined, and obtain first image coordinates indicating a position of the first reference point and second image coordinates indicating a position of the second reference point, in an image coordinate system.

According to an embodiment, the processor may obtain first stereoscopic coordinates indicating the position of the first reference point and second stereoscopic coordinates indicating the position of the second reference point, in a world coordinate system, based on the first image coordinates and the second image coordinates. The processor may calculate the gradient of the horizontal reference line by calculating a gradient of a straight line connecting the first stereoscopic coordinates and the second stereoscopic coordinates on the horizontal plane.

According to an embodiment, the processor may obtain the first stereoscopic coordinates and the second stereoscopic coordinates using a Homography image matching method.

According to an embodiment, the processor may calculate a distance difference between the first stereoscopic coordinates and the second stereoscopic coordinates on a horizontal axis perpendicular to a reference axis indicating the front direction of the vehicle. The processor may further calculate a depth difference between the first stereoscopic coordinates and the second stereoscopic coordinates, and calculate the gradient of the horizontal reference line based on the distance difference and the depth difference.

According to an embodiment, the processor may calculate a depth of each of the first stereoscopic coordinates and the second stereoscopic coordinates based on an actual length of the horizontal reference line, a focal length, and a length of the horizontal reference line in the image coordinate system.

According to an embodiment, the processor may recognize a license plate of the target object in the target region, detect a horizontal side corresponding to the horizontal reference line in the license plate. The processor may calculate a length of the horizontal side of the license plate based on an aspect ratio of the license plate.

According to an embodiment, the processor may calculate a gradient of a reference vector indicating the front direction of the target object on the horizontal plane, and calculate an interior angle between the horizontal axis and the reference vector based on the gradient of the reference vector. The processor may further calculate the heading angle difference between the reference axis and the reference vector based on the interior angle.

According to an embodiment, the processor may calculate the gradient of the horizontal reference line on the horizontal plane, and obtain the gradient of the reference vector by calculating a gradient orthogonal to the gradient of the horizontal reference line.

According to an aspect of the present disclosure, a method of determining a position of an object outside a vehicle, includes detecting a target region corresponding to a target object in an external image of the vehicle. The method further includes: detecting a predetermined horizontal reference line in the target region, and calculating a gradient of the horizontal reference line perpendicular to a front direction of the vehicle on a horizontal plane parallel to a road surface. The method further includes calculating a heading angle difference between the vehicle and the target object based on the gradient of the horizontal reference line.

According to an embodiment, the detecting of the horizontal reference line may include detecting the horizontal reference line perpendicular to a front direction of the target object.

According to an embodiment, the detecting of the horizontal reference line may include determining a first reference point and a second reference point on the horizontal reference line, the first reference point and the second reference point being randomly determined, and obtaining first image coordinates indicating a position of the first reference point and second image coordinates indicating a position of the second reference point, in an image coordinate system.

According to an embodiment, the calculating of the gradient of the horizontal reference line may include obtaining first stereoscopic coordinates indicating the position of the first reference point and second stereoscopic coordinates indicating the position of the second reference point, in a world coordinate system, based on the first image coordinates and the second image coordinates, and calculating a gradient of a straight line connecting the first stereoscopic coordinates and the second stereoscopic coordinates on the horizontal plane.

According to an embodiment, the obtaining of the first stereoscopic coordinates and the second stereoscopic coordinates may include using a homography image matching method.

According to an embodiment, the calculating of the gradient of the horizontal reference line may include calculating a distance difference between the first stereoscopic coordinates and the second stereoscopic coordinates on a horizontal axis perpendicular to a reference axis indicating the front direction of the vehicle, calculating a depth difference between the first stereoscopic coordinates and the second stereoscopic coordinates, and calculating the gradient of the horizontal reference line based on the distance difference and the depth difference.

According to an embodiment, the calculating of the depth difference may include calculating a depth of each of the first stereoscopic coordinates and the second stereoscopic coordinates based on an actual length of the horizontal reference line, a focal length, and a length of the horizontal reference line in the image coordinate system.

According to an embodiment, wherein the calculating of the depth difference may include recognizing a license plate of the target object in the target region, detecting a horizontal side corresponding to the horizontal reference line in the license plate, and calculating a length of the horizontal side of the license plate based on an aspect ratio of the license plate.

According to an embodiment, the calculating of the heading angle difference between the vehicle and the target object may include calculating a gradient of a reference vector indicating the front direction of the target object on the horizontal plane, calculating an interior angle between the horizontal axis and the reference vector based on the gradient of the reference vector, and calculating the heading angle difference between the reference axis and the reference vector based on the interior angle.

According to an embodiment, the calculating of the gradient of the reference vector may include calculating the gradient of the horizontal reference line on the horizontal plane, and obtaining the gradient of the reference vector by calculating a gradient orthogonal to the gradient of the horizontal reference line.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
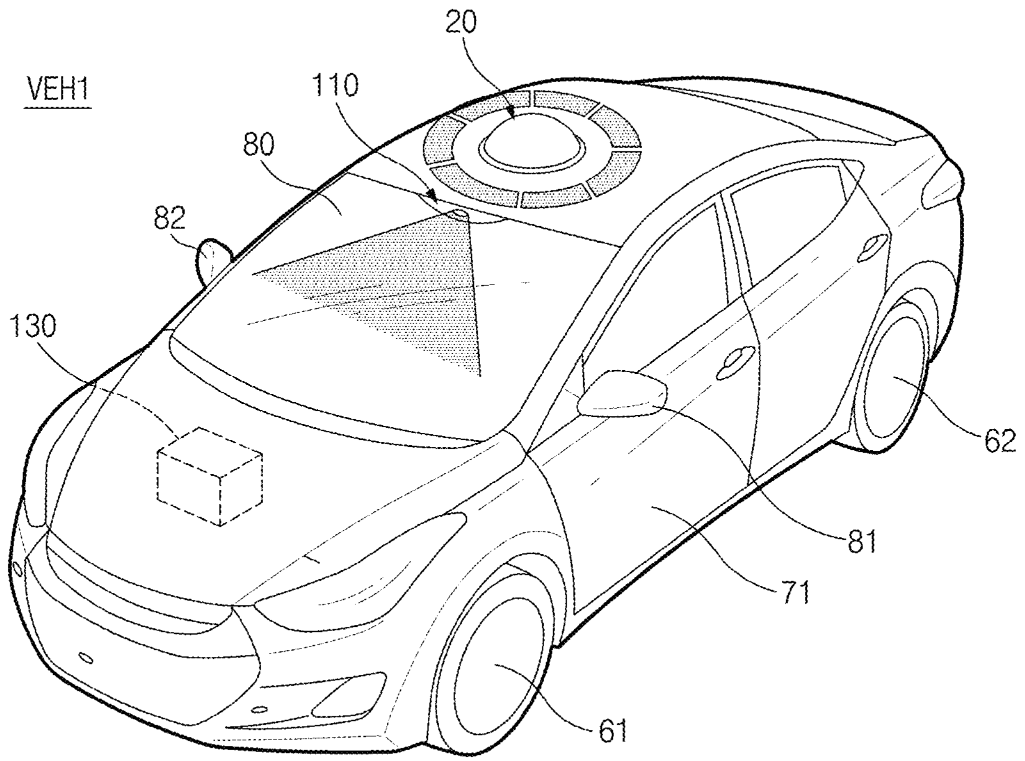
FIG. 1 is a diagram illustrating a vehicle according to an embodiment of the present disclosure.

Hereinafter, embodiments of the present disclosure are described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions has been ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure are be described in detail with reference to FIGS. 1 to 14.

FIG. 1 is a diagram illustrating a vehicle according to an embodiment of the present disclosure.

Referring to FIG. 1, a vehicle VEH1 according to an embodiment of the present disclosure may include wheels 61 and 62, doors 71, a windshield 80, side mirrors 81 and 82, and a processor 130.

The wheels 61 and 62 may include the front wheel 61 provided at the front of the vehicle and the rear wheel 62 provided at the rear of the vehicle, and the front wheel 61 and the rear wheel 62 may be rotated by a driving device to move the vehicle VEH1.

The doors 71 may be rotatably provided on the left and right sides of a main body to allow passengers to board the inside of the vehicle VEH1 when opened, and to shield the inside of the vehicle VEH1 from the outside when closed.

The windshield 80, which is a kind of windscreen, may be provided on the front upper side of the main body 2 to provide a driver or user inside the vehicle VEH with information about the front view of the vehicle VEH1.

The side mirrors 81 and 82 may include the left side mirror 81 provided on the left side of the main body 2 and the right side mirror 82 provided on the right side of the main body 2, to provide the driver inside the vehicle VEH1 with information about the side and rear views of the vehicle VEH1.

A camera 110 and a LIDAR 20 for obtaining space information may be mounted outside the vehicle VEH1.

Figure 2:
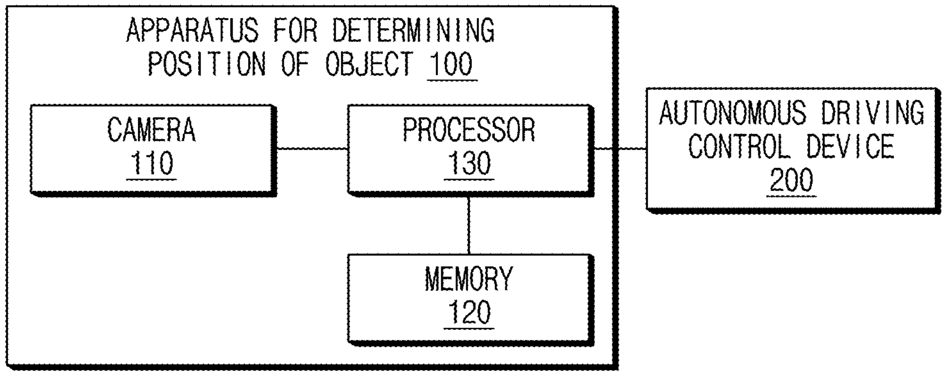
FIG. 2 is a block diagram illustrating a configuration of an apparatus for determining a position of an object according to an embodiment of the present disclosure.

FIG. 2 is a block diagram illustrating a configuration of an apparatus for determining a position of an object according to an embodiment of the present disclosure.

Referring to FIG. 2, an apparatus for determining a position of an object according to an embodiment of the present disclosure may include the camera 110, a memory 120, and the processor 130.

The camera 110 is for obtaining an external image of the vehicle, and may be disposed close to the front windshield or disposed around the front bumper or radiator grill.

The memory 120 may store algorithms and AI processors for the operation of the processor 130. The memory 120 may be implemented using a hard disk drive, flash memory, electrically erasable programmable read-only memory (EEPROM), static RAM (SRAM), ferro-electric RAM (FRAM), phase-change RAM (PRAM), magnetic RAM (MRAM), Dynamic Random Access (DRAM), Synchronous Dynamic Random Access Memory (SDRAM), Double Date Rate-SDRAM (DDR-SDRAM), and the like.

The processor 130 may detect a target region corresponding to a target object from an external image acquired by the camera 110.

The processor 130 may detect a predetermined horizontal reference line in the target region and calculate a gradient of the horizontal reference line. The horizontal reference line may be perpendicular to the front direction of the target object and may be set in advance. The horizontal reference line may be a structure or pattern added for the implementation of the present disclosure, and a structure or pattern of a general vehicle may be used. According to an embodiment, as the horizontal reference line, a license plate that is essentially mounted on a vehicle may be used. For example, the processor 130 may use a line segment corresponding to the horizontal line of the license plate as a horizontal reference line. The gradient of the horizontal reference line may refer to how much the horizontal reference line is inclined on a horizontal plane parallel to the road surface. In other words, the horizontal plane may mean the gradient of the horizontal reference line in a top-view image. However, according to an embodiment of the present disclosure, a process of additionally obtaining a top-view image may be omitted by calculating the gradient of the horizontal reference line based on a depth obtained based on a 2D image.

The processor 130 may calculate a heading angle difference between a vehicle "VEH1" and a target object based on the gradient of the horizontal reference line. The heading angle difference between the vehicle VEH1 and the target object may refer to a difference between the front direction of the vehicle VEH1 and the front direction of the target object.

Also, the processor 130 may perform artificial intelligence learning on the external image provided from the camera 110 to detect a target object and a dangerous vehicle. To this end, the processor 130 may include an artificial intelligence (hereinafter referred to as AI) processor. The AI processor may learn a neural network using a pre-stored program. A neural network for detecting a target object and a dangerous vehicle may be designed to simulate a human brain structure on a computer, and may include a plurality of network nodes having weights that simulate neurons of a human neural network. The plurality of network nodes may transmit and receive data according to their connection relationships so as to simulate synaptic activity of neurons that transmit and receive signals through synapses. The neural network may include a deep learning model developed from a neural network model. In the deep learning model, a plurality of network nodes may exchange data according to convolution connection relationships while being located in different layers. Examples of neural network models may include various deep learning techniques such as deep neural networks (DNN), convolutional deep neural networks (CNN), recurrent Boltzmann machines (RNN), restricted Boltzmann machines (RBM), deep belief networks (DBN) and deep Q-networks.

The processor 130 may control an autonomous driving control device 200 based on a scenario determined according to a heading angle difference. For example, the processor 130 may determine whether the target object is attempting to cut-in based on the heading angle difference with respect to the target object, or determine driving intention such as the target object attempting to change lanes. Based on the driving intention of the target object, the processor 130 may control the autonomous driving control device 200 to determine vehicle steering, vehicle deceleration, vehicle acceleration, and the like.

The autonomous driving control device 200 may be for controlling driving of a vehicle in response to a control signal from the processor 130, and may include a steering controller, an engine controller, a brake controller, and a transmission control module. The autonomous driving control device 200 is not limited to a device installed in a vehicle that is driving according to an autonomous driving level defined by the Society of Automotive Engineers, and may collectively refer to a driving assistance device that enhances user convenience under the control of the processor 130.

The steering controller may be classified into a Hydraulic Power Steering (HPS) system that controls steering using hydraulic pressure generated by a hydraulic pump and a Motor Driven Power Steering (MDPS) system that controls steering using output torque of an electric motor (hereinafter referred to as 'MDPS').

The engine controller may be an actuator that controls an engine of a vehicle and may control acceleration of the vehicle. The engine controller may be implemented with an Engine Management System (EMS). The engine controller may control a driving torque of the engine according to accelerator pedal position information output from an accelerator pedal position sensor. The engine controller may control engine output to follow the driving speed of the vehicle requested from the processor 130 during autonomous driving.

The brake controller is an actuator that controls the deceleration of the vehicle, and may be implemented with an electronic stability control (ESC). The brake controller may control a brake pressure to follow the target speed requested from the processor 130. That is, the brake controller may control deceleration of the vehicle.

The transmission control module is an actuator that controls a transmission of the vehicle and may be implemented with a Shift-By-Wire (SBW). The transmission control module may control the shift of the vehicle according to a gear position and a gear state range.

Figure 3:
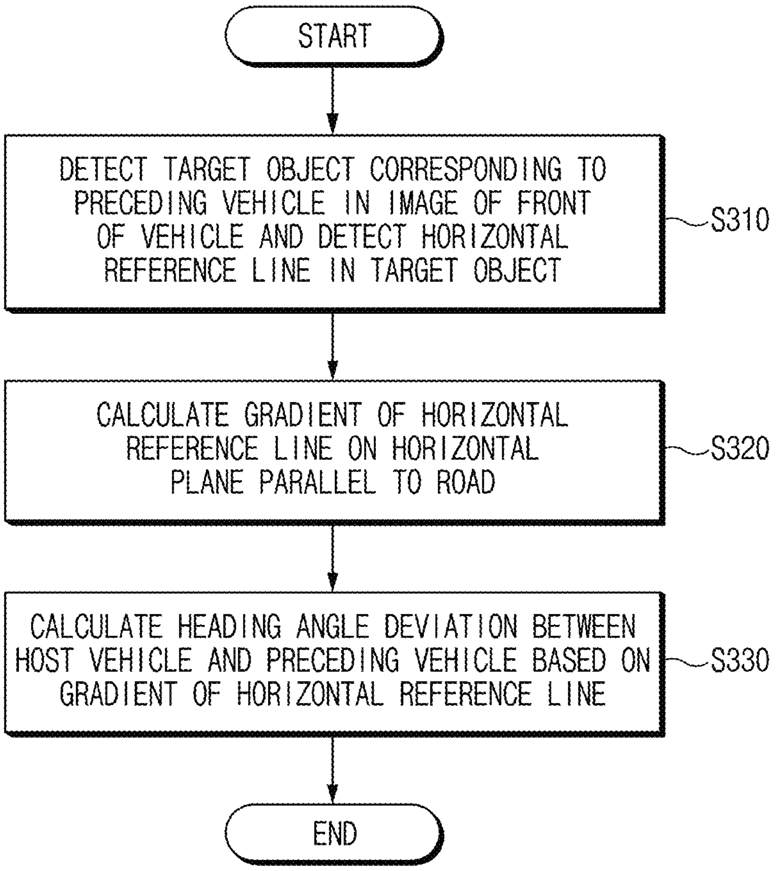
FIG. 3 is a flowchart for describing a method for determining a position of an object according to an embodiment of the present disclosure.

FIG. 3 is a flowchart for describing a method of determining a position of an object according to an embodiment of the present disclosure. FIG. 3 may be a process performed by the processor shown in FIG. 2.

A method of determining a position of an object according to an embodiment of the present disclosure is described with reference to FIG. 3.

In an operation S310, the processor 130 may detect a target region corresponding to a target object from an external image of a vehicle. Also, the processor 130 may detect a predetermined horizontal reference line in the target region.

The horizontal reference line may refer to a line perpendicular to the traveling direction of the target object, and may be set in advance. The horizontal reference line may be any one of the horizontal lines of a license plate, and may be, for example, the upper side of the license plate.

In an operation S320, the processor may calculate a gradient (e.g., slope or incline) of the horizontal reference line on a horizontal plane.

The horizontal plane may be a plane parallel to the road surface, and may be a plane determined by a reference axis in a front direction of the vehicle and a horizontal axis perpendicular to the reference axis which is formed along the width direction of the vehicle.

The gradient of the horizontal reference line may mean a gradient on the horizontal plane, and may mean the amount of change in the horizontal reference line on the reference axis with respect to the amount of change in the horizontal reference line on a vertical axis.

In S330, the processor 130 may calculate a heading angle difference between the vehicle VEH1 and a target object based on the gradient of the horizontal reference line.

The heading angle difference between the vehicle VEH1 and the target object may mean an angle between the front direction of the vehicle VEH1 and the front direction of the target object. When a vector indicating the front direction of the target object is called a reference vector, the heading angle difference may have the same magnitude as the interior angle between the reference axis and the reference vector.

Because the horizontal reference line is perpendicular to the traveling direction of the target object, the horizontal reference line and the reference vector may be orthogonal to each other. Therefore, the gradient of the reference vector may be calculated using the gradient of the horizontal reference line, because the product of the gradient of the reference vector and the horizontal reference line is "−1".

The interior angle between the reference vector and the horizontal axis may be calculated using the gradient of the reference vector and a trigonometric function.

Therefore, the heading angle difference may be obtained by subtracting the interior angle from 90 degrees (°).

Hereinafter, a detailed embodiment of each operation is described.

Figure 4:
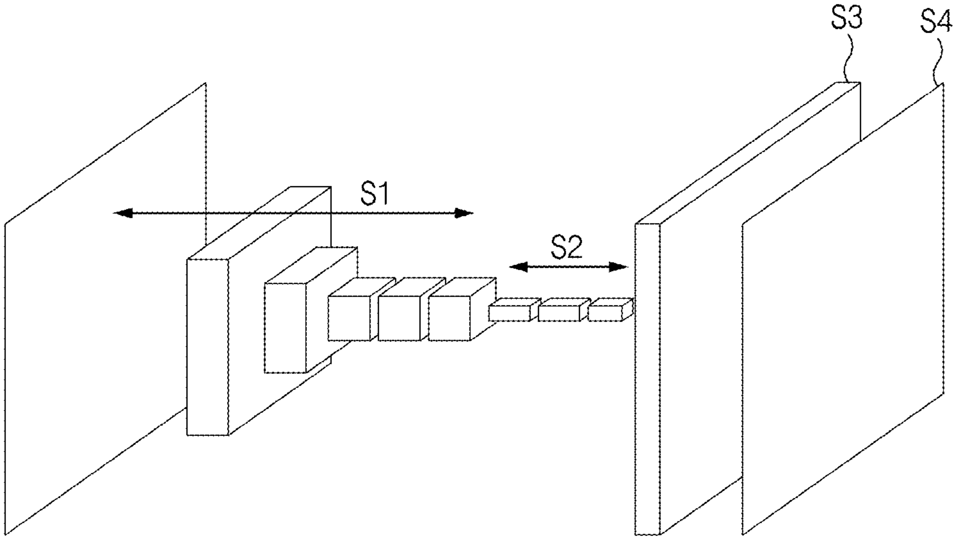
FIG. 4 is a diagram illustrating an example of a segmentation model.
Figure 5:
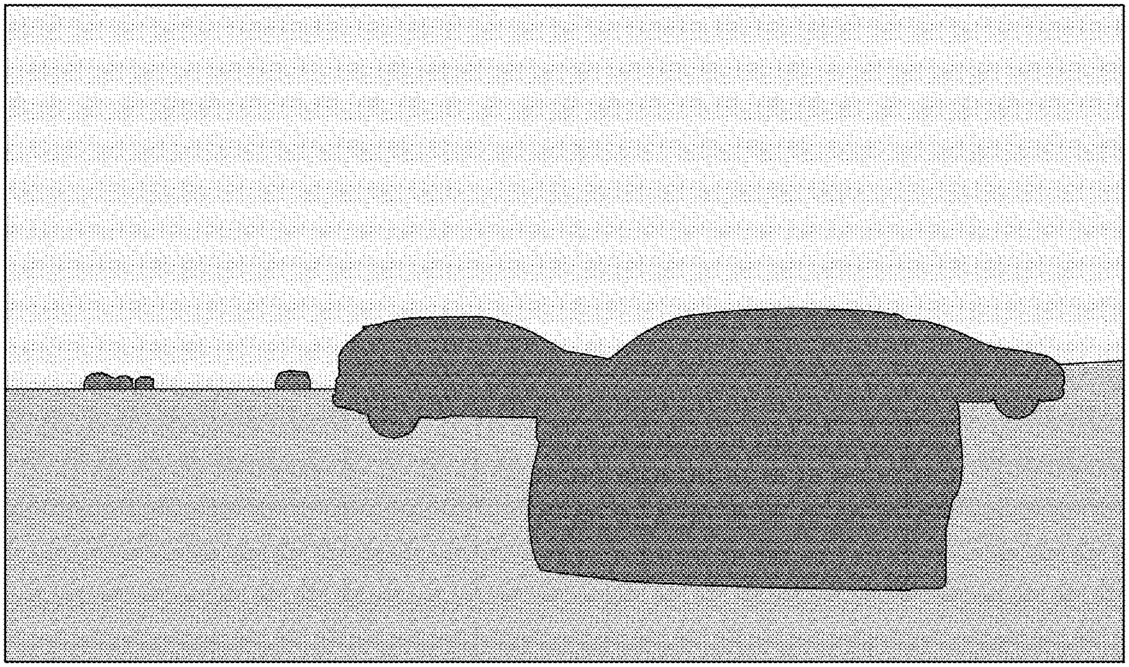
FIG. 5 is a diagram illustrating class classification output by a segmentation model.

FIGS. 4 and 5 are diagrams for describing an embodiment of detecting a target region. FIG. 4 is a diagram showing an example of a segmentation model, and FIG. 5 is a diagram showing class classification output from the segmentation model.

The processor 130 may perform image learning using a FCN model as shown in FIG. 4.

FCN is a modification of a convolutional neural networks (CNN)-based model that has shown excellent performance in image classification, and may be for a semantic segmentation task.

Image classification may be implemented with a structure of extracting features from all pixels in an image, and inputting the extracted features to a classifier to predict the class of an input image (Total). A typical image classification model may include a Fully Connected layer (FCL) in the last layer of the network. Because an input with a fixed size is required to use FCL, position information may disappear after passing through FCL. Therefore, FCL may not be suitable for segmentation that necessarily requires position information.

FCN may have a structure in which the last FCLs are replaced with a convolution layer.

As illustrated in FIG. 4, the processor 130 may perform the following functions using FCN.

In S1, the processor 130 may extract feature values from an external image through a convolution layer.

In S2, the processor 130 may change the number of channels of a feature map to be the same as the number of objects of a dataset using a 1×1 convolution layer.

In S3, the processor 130 may up-sample a low-resolution heat map through up-sampling, and then generate a map having the same size as an input image.

In S4, the processor 130 may extract feature maps classified by class. In other words, as shown in FIG. 5, the processor 130 may detect objects corresponding to vehicles.

Figure 6:
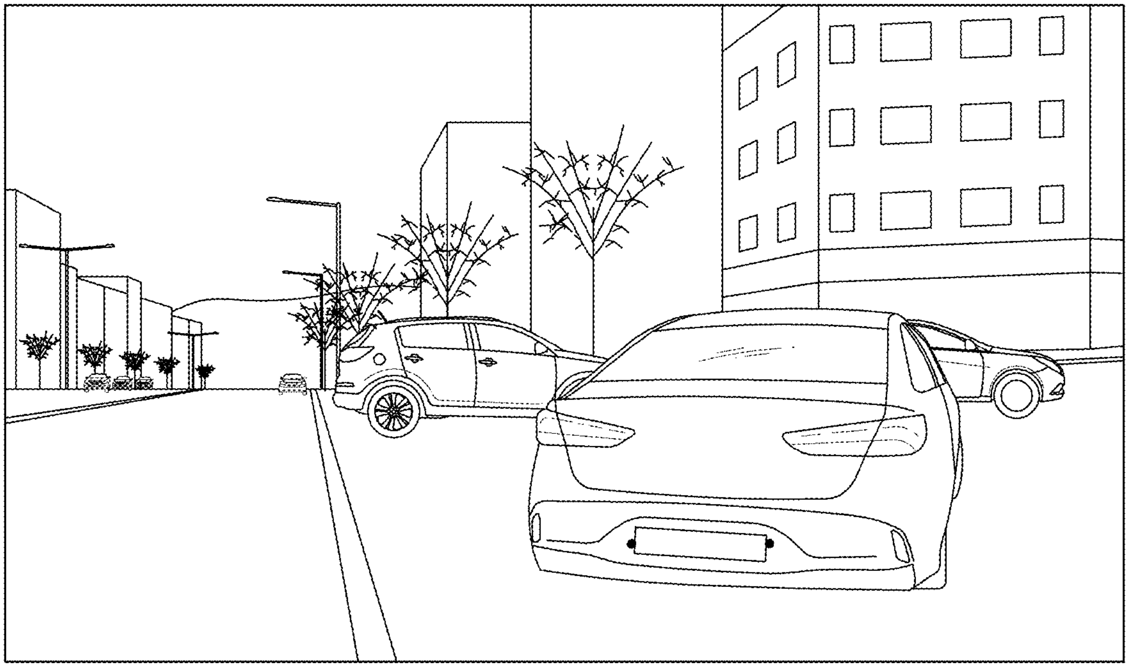
FIGS. 6 to 8 are diagrams for describing an embodiment of detecting a license plate from a target region through keypoint estimation.
Figure 7:
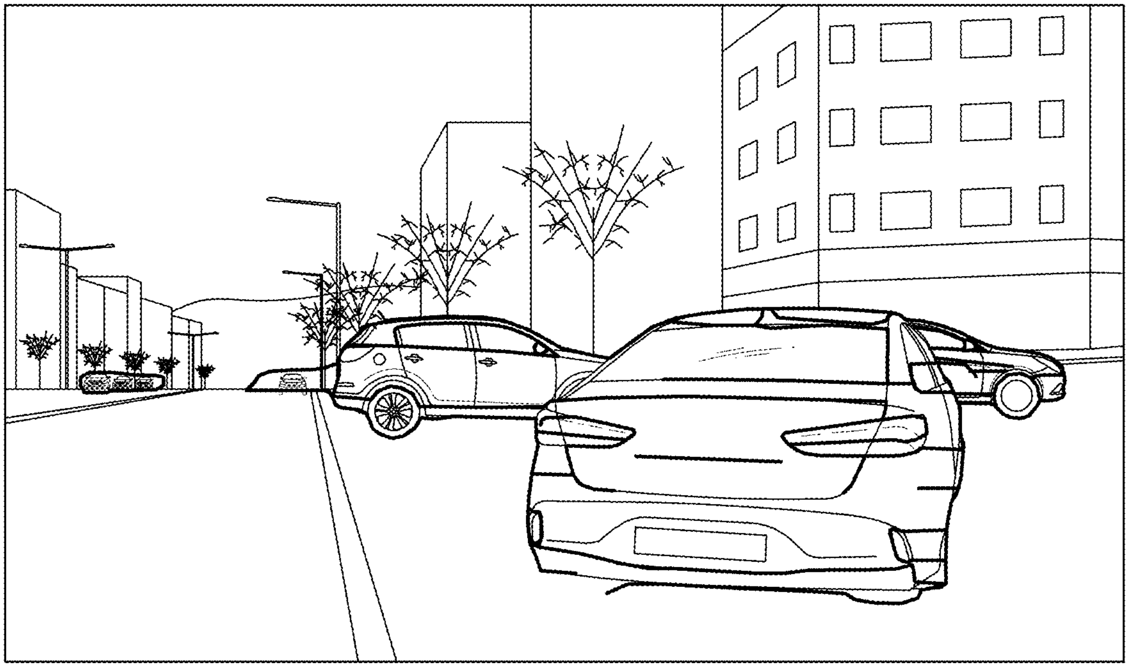
Figure 8:
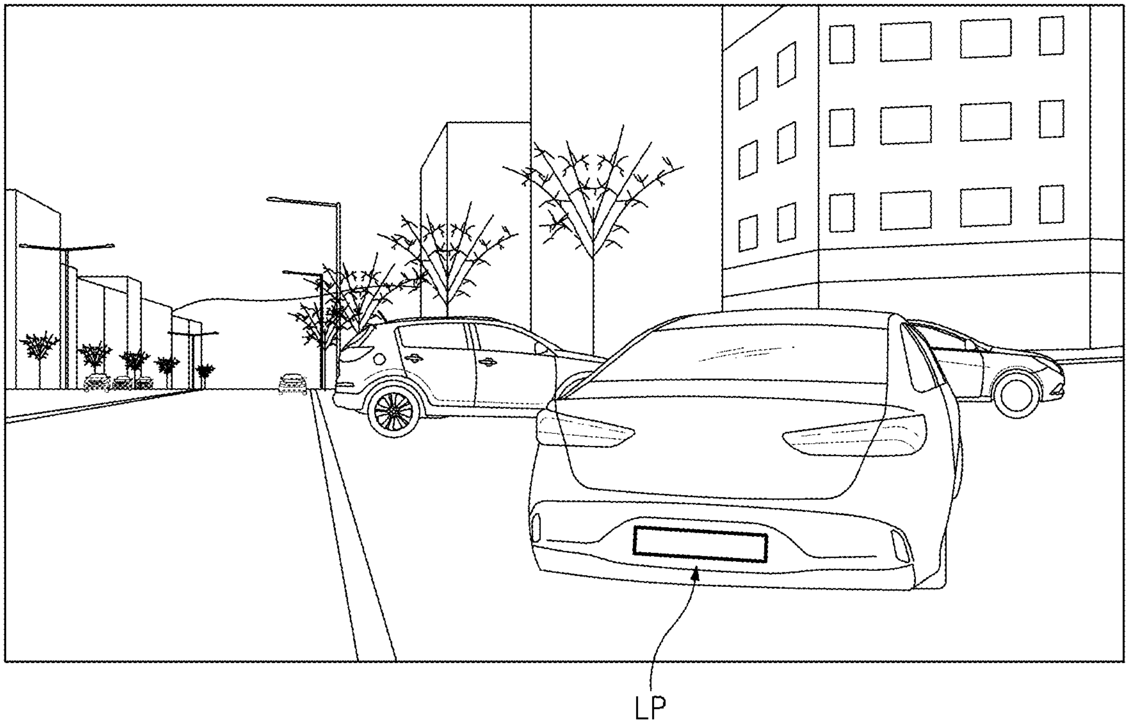

FIGS. 6 to 8 are diagrams for describing an embodiment of detecting a license plate from a target region through keypoint estimation.

As shown in FIG. 6, the processor 130 may extract vehicle feature points from an external image and extract an ID matching a license plate from among the extracted feature points.

As shown in FIG. 7, the processor 130 may perform edge detection on pixels around the license plate.

Also, as shown in FIG. 8, the processor 130 may extract a license plate LP by compensating a result of edge detection through keypoint estimation.

As described above, the processor 130 may detect a target region from the external image and detect the license plate LP from the target object by fusion of AI learning of the segmentation and keypoint estimation methods.

Figure 9:
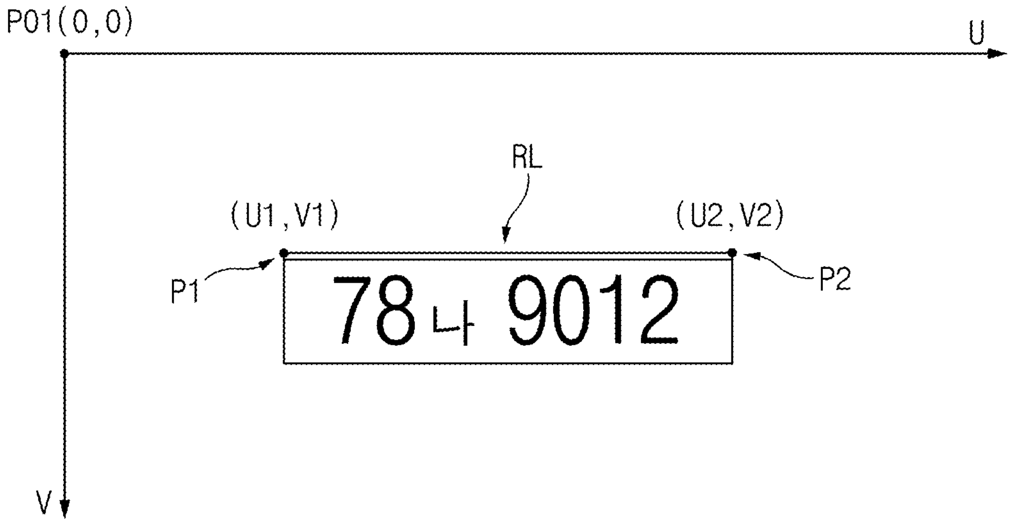
FIG. 9 is a diagram for describing a method for determining image coordinates of a horizontal reference line according to an embodiment of the present disclosure.

FIG. 9 is a diagram for describing a method of determining image coordinates of a horizontal reference line according to an embodiment of the present disclosure. Although a description has been given centering on the horizontal reference line detected from the license plate in FIG. 9, as described above, the horizontal reference line may not be limited to one side of the license plate.

Referring to FIG. 9, the processor 130 may determine one side of a license plate as a horizontal reference line RL. The processor 130 may determine two arbitrary points on the horizontal reference line RL as a first reference point P1 and a second reference point P2, and the first reference point P1 and the second reference point P2 may be end points of the horizontal reference line RL, respectively. Accordingly, the first reference point P1 and the second reference point P2 may be upper corners among the corners of the license plate.

The image coordinate system may be a coordinate system in which the top left pixel of an image is an origin PO1 and, in the image, a horizontal position of a pixel is expressed as "u" and a vertical position of the pixel is expressed as "v". For example, the first reference point P1 may be expressed as (u1, v1), and the second reference point P2 may be expressed as (u2, v2).

Figure 10:
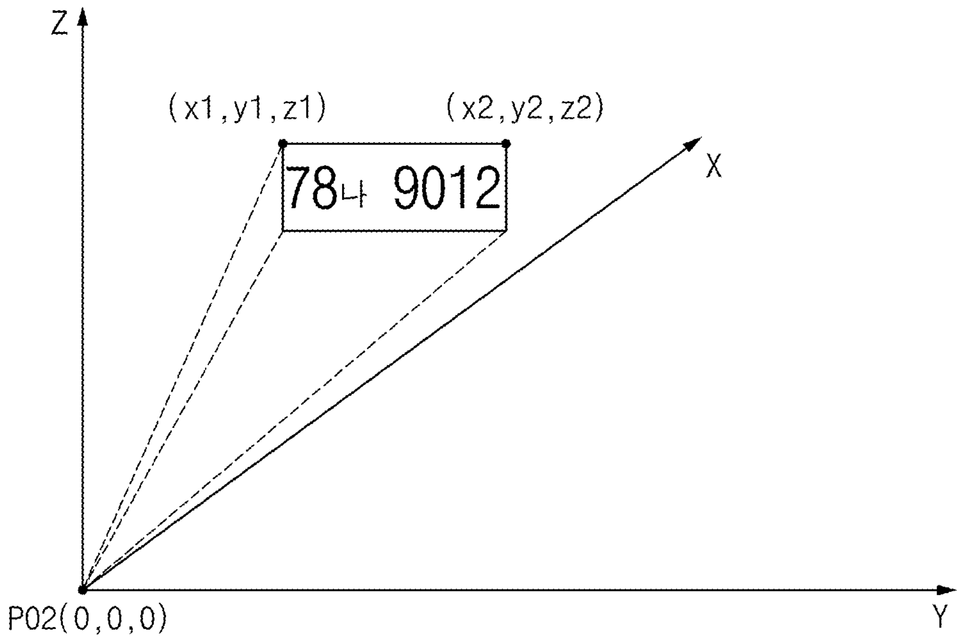
FIG. 10 is a diagram explaining a method of obtaining three-dimensional coordinates of a horizontal reference line according to an embodiment of the present disclosure.

FIG. 10 is a diagram for describing a method of obtaining stereoscopic coordinates of a horizontal reference line according to an embodiment of the present disclosure.

Referring to FIG. 10, the processor 130 may express image coordinates of the first reference point P1 and the second reference point P2 as coordinates in a world coordinate system. The world coordinate system may be for representing a position of an arbitrary point in real physical space. In an embodiment of the present disclosure, an origin PO2 of the world coordinate system may be a point where a straight line passing through the center of the front bumper of the vehicle and perpendicular to the horizontal plane intersects the horizontal plane.

The x-axis may be a reference axis indicating a front direction of the vehicle, and the y-axis may be referred to as a horizontal axis indicating a direction perpendicular to the reference axis on the same plane as the x-axis. The xy plane may be referred to as a horizontal plane parallel to the road surface. The z axis is an axis perpendicular to the xy plane and may be an axis for expressing a height from the road surface.

The processor 130 may convert image coordinates into stereoscopic coordinates using a Homography matrix. A homography (H) relationship may be established between the image coordinates and the stereoscopic coordinates.

Therefore, the stereoscopic coordinates having coordinate values of (x, y, z) may be obtained using the following [Equation 1] based on the values of (u, v, d).

$$[x, y, z, 1]^T = H_{4x4}^{-1} \cdot [d \cdot u, d \cdot v, d, 1]^T \quad \text{[Equation 1]}$$

In [Equation 1], "d" may denote a depth value. The depth value "d" may be calculated based on the actual length of the horizontal reference line, the length of the horizontal reference line in image coordinates, and the focal length.

The depth value "d" may be calculated using the following [Equation 2].

$$d = f\frac{L1}{L2} \quad \text{[Equation 2]}$$

In [Equation 2], L1 may denote the actual length of the horizontal reference line, L2 may denote the length of the horizontal reference line in image coordinates, and f may denote the focal length.

As a result, the processor 130 may obtain first position coordinates (x1, y1, z1) representing the position of the first reference point P1 and second position coordinates (x2, y2, z2) representing the position of the second reference point P2.

The processor 130 may obtain the actual length of the horizontal reference line based on the aspect ratio of the license plate. A detailed description is given with reference to FIG. 11 below.

FIGS. 11A and 11B are diagrams illustrating examples of a specification of a license plate.

FIG. 11A shows a license plate having a horizontal length of 355 mm and a vertical length of 170 mm, and FIG. 11B shows a license plate having a horizontal length of 520 mm and a vertical length of 110 mm.

Figure 11:
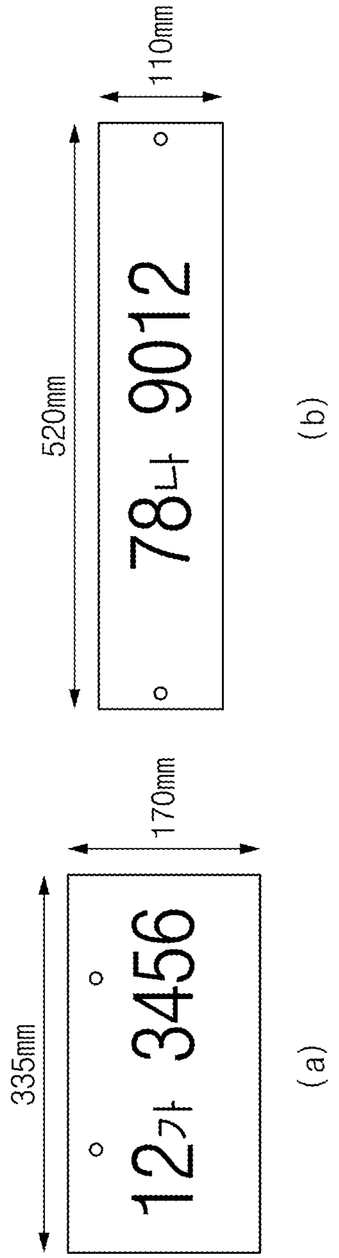
FIG. 11 is a diagram illustrating an example of a specification of a license plate.

The actual length of the horizontal reference line may be the horizontal length of the license plate, and the horizontal length of the license plate may be changed depending on the shape of the license plate, as shown in FIG. 11. In addition, the aspect ratio of the license plate may be changed depending on the shape of the license plate. The aspect ratio of the license plate shown in FIG. 11A may be about 1.97, and the aspect ratio of the license plate shown in FIG. 11B may be about 4.73. The processor 130 may determine the aspect ratio of the license plate based on the image coordinates, when the aspect ratio of the license plate is less than or equal to a threshold, determine the length of 335 mm shown in FIG. 11A as the actual length of the horizontal reference line and, when the aspect ratio of the license plate is more than or equal to a threshold, determine the length of 520 mm shown in FIG. 11B as the actual length of the horizontal reference line. The threshold may be determined as a value between the aspect ratio (1.97) of the license plate shown in FIG. 11A and the aspect ratio (4.73) of the license plate shown in FIG. 11B, and may be set to, for example, 3.5.

Figure 12:
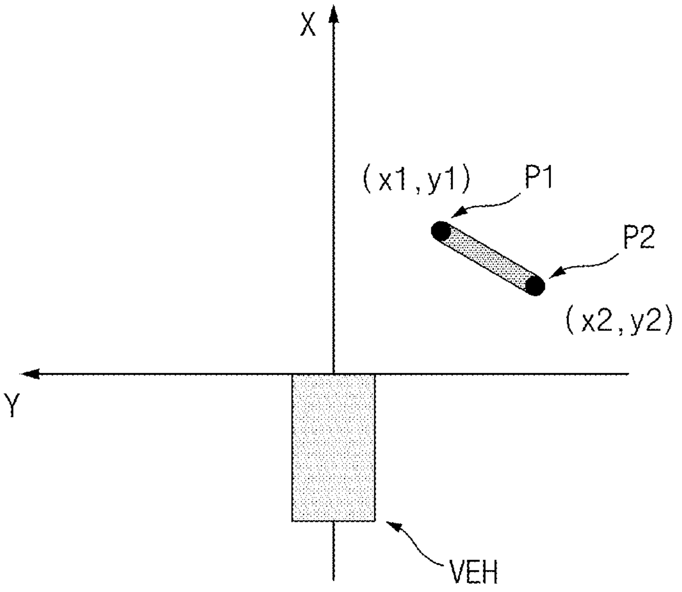
FIG. 12 is a diagram for describing a method for calculating a gradient of a horizontal reference line according to an embodiment of the present disclosure.

FIG. 12 is a diagram for describing a method of calculating a gradient of a horizontal reference line according to an embodiment of the present disclosure. FIG. 12 shows a vehicle and a horizontal reference line on a horizontal plane, which is an xy plane, and may mean a top-view image.

The gradient of the horizontal reference line may mean a change amount on a reference axis (X) with respect to a change amount on a horizontal axis (Y) on the horizontal plane. Accordingly, on the horizontal plane, when the coordinates of the first reference point P1 are (x1, y1) and the coordinates of the second reference point P2 are (x2, y2), the processor 130 may calculate a gradient Gr1 of the horizontal reference line as follows.

$$Gr1 = \frac{x_2 - x_1}{y_2 - y_1} \quad \text{[Equation 3]}$$

Figure 13:
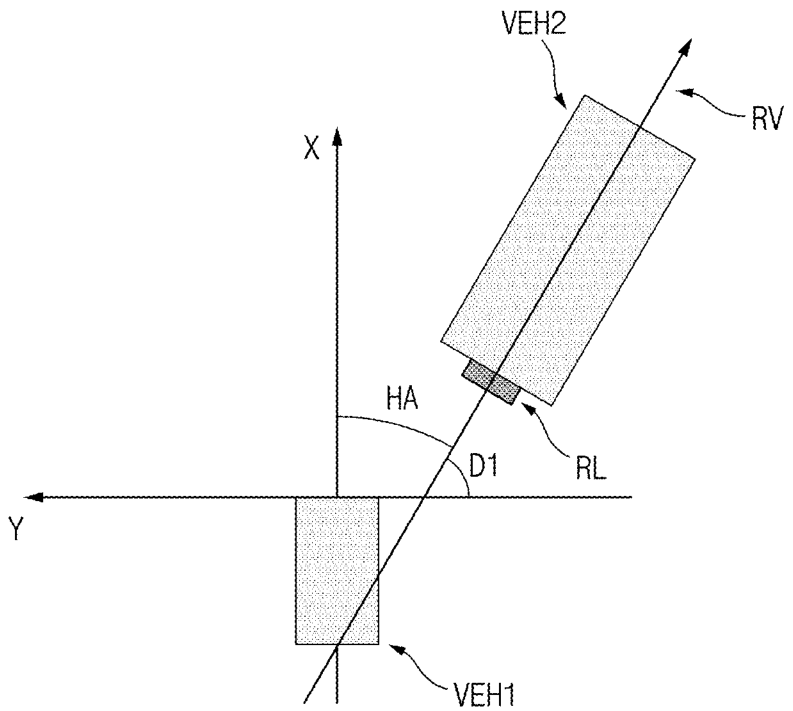
FIG. 13 is a diagram for describing a method for calculating a heading angle difference value according to an embodiment of the present disclosure.

FIG. 13 is a diagram for describing a method of calculating a heading angle difference value according to an embodiment of the present disclosure.

Referring to FIG. 13, the processor 130 may calculate the gradient of a reference vector RV based on the gradient of a horizontal reference line RL. Because the horizontal reference line RL is perpendicular to the traveling direction of a target object VEH2, the horizontal reference line RL and the reference vector RV may be orthogonal to each other. Accordingly, a gradient Gr2 of the reference vector RV may be determined as the magnitude of "−(1/Gr1)", and Gr1 may mean the gradient of the horizontal reference line.

The tan value of an interior angle D1 between the reference vector RV and the horizontal axis Y may be equal to the gradient Gr2 of the reference vector RV. That is, because the relationship of tan(D1)=(Gr2) is established, the interior angle D1 between the reference vector RV and the horizontal axis Y may be calculated using the following [Equation 4] in conjunction with [Equation 3].

$$D1 = tan^{-1}(Gr2) = tan^{-1}\left(-\frac{1}{Gr1}\right) = tan^{-1}\left(-\frac{y_2 - y_1}{x_2 - x_1}\right) \quad \text{[Equation 4]}$$

Also, the processor 130 may calculate a heading angle difference "HA" by subtracting the interior angle "D1" from 90 degrees (°). The interior angle "D1" is an angle between the reference vector RV and the horizontal axis Y.

Also, the processor 130 may control the autonomous driving control device 200 based on a scenario determined according to the heading angle difference HA.

Figure 14:
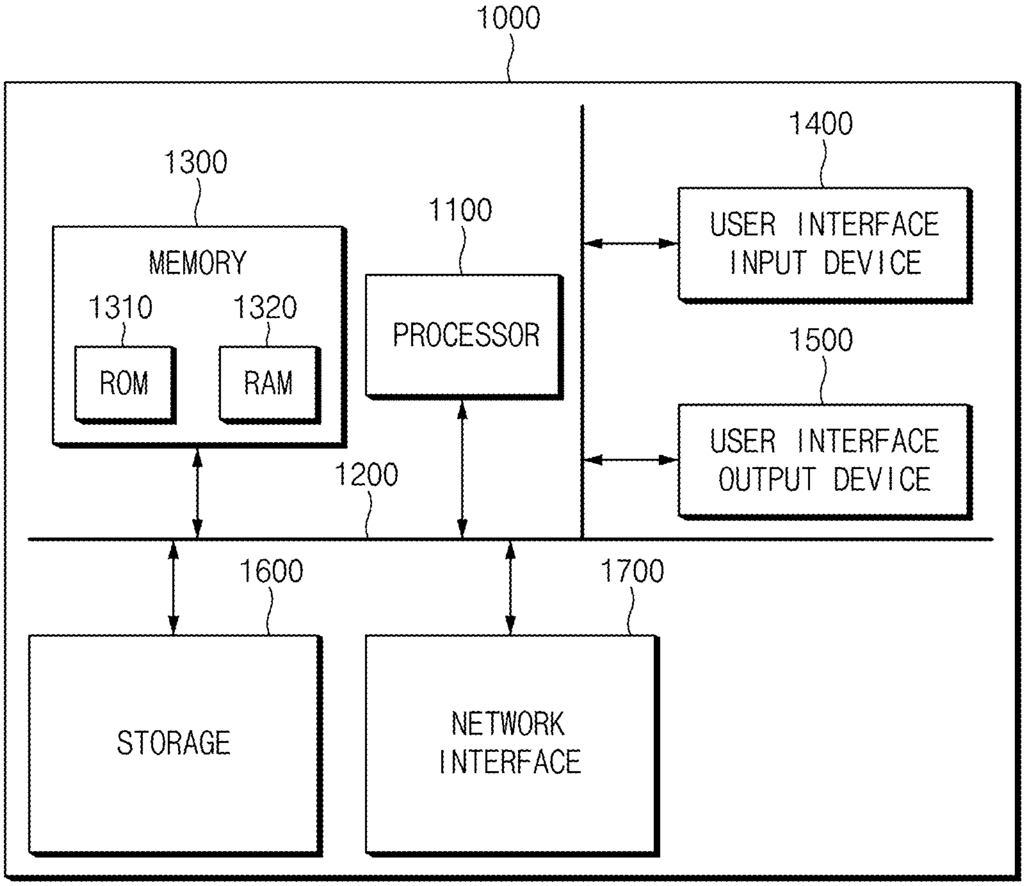
FIG. 14 is a diagram illustrating a computing system according to an embodiment of the present disclosure.

FIG. 14 illustrates a computing system according to an embodiment of the present disclosure.

Referring to FIG. 14, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) and a Random Access Memory (RAM).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

According to the embodiment of the present disclosure, it is possible to determine the heading angle of the vehicle more accurately through simplified image analysis.

In addition, according to the embodiment of the present disclosure, it is possible to more accurately determine the driving intention of a target object based on the heading angle of the target object, and accordingly, control the vehicle more accurately.

In addition, various effects may be provided that are directly or indirectly understood through the disclosure.

Hereinabove, although the present disclosure has been described with reference to exemplary embodiments and the accompanying drawings, the present disclosure is not limited thereto, but may be variously modified and altered by those having ordinary skill in the art to which the present disclosure pertains without departing from the spirit and scope of the present disclosure.

What is claimed is:

1. An apparatus for determining a position of an object outside a host vehicle, comprising:

a camera configured to obtain an external image of a target object; and a processor configured to:

detect a target region corresponding to the target object in the external image, detect a horizontal reference line in the target region, determine a gradient of the horizontal reference line perpendicular to a front direction of the host vehicle on a horizontal plane parallel to a road surface, and determine a heading angle difference between the host vehicle and the target object based on the gradient of the horizontal reference line.

2. The apparatus of claim 1, wherein the processor is configured to detect the horizontal reference line perpendicular to a front direction of the target object.

3. The apparatus of claim 2, wherein the processor is configured to:

determine a first reference point and a second reference point on the horizontal reference line, the first reference point and the second reference point being randomly determined; and obtain first image coordinates indicating a position of the first reference point and second image coordinates indicating a position of the second reference point, in an image coordinate system.

4. The apparatus of claim 3, wherein the processor is configured to:

obtain first stereoscopic coordinates indicating the position of the first reference point and second stereoscopic coordinates indicating the position of the second reference point, in a world coordinate system, based on the first image coordinates and the second image coordinates; and determine the gradient of the horizontal reference line by calculating a gradient of a straight line connecting the first stereoscopic coordinates and the second stereoscopic coordinates on the horizontal plane.

5. The apparatus of claim 4, wherein the processor is configured to obtain the first stereoscopic coordinates and the second stereoscopic coordinates using a homography image matching method.

6. The apparatus of claim 4, wherein the processor is configured to:

determine a distance difference between the first stereoscopic coordinates and the second stereoscopic coordinates on a horizontal axis perpendicular to a reference axis indicating the front direction of the host vehicle;

determine a depth difference between the first stereoscopic coordinates and the second stereoscopic coordinates; and determine the gradient of the horizontal reference line based on the distance difference and the depth difference.

7. The apparatus of claim 6, wherein the processor is configured to calculate a depth of each of the first stereoscopic coordinates and the second stereoscopic coordinates based on an actual length of the horizontal reference line, a focal length, and a length of the horizontal reference line in the image coordinate system.

8. The apparatus of claim 6, wherein the processor is configured to:

recognize a license plate of the target object;

detect a horizontal side corresponding to the horizontal reference line in the license plate; and determine a length of the horizontal side of the license plate based on an aspect ratio of the license plate.

9. The apparatus of claim 4, wherein the processor is configured to:

determine a gradient of a reference vector indicating the front direction of the target object on the horizontal plane;

determine an interior angle between a horizontal axis and the reference vector based on the gradient of the reference vector; and determine the heading angle difference between a reference axis and the reference vector based on the interior angle.

10. The apparatus of claim 9, wherein the processor is configured to:

determine the gradient of the horizontal reference line on the horizontal plane; and obtain the gradient of the reference vector by calculating a gradient orthogonal to the gradient of the horizontal reference line.

11. A method of determining a position of an object outside a vehicle, comprising:

detecting a target region corresponding to a target object in an external image of the vehicle and detecting a horizontal reference line in the target region;

determining a gradient of the horizontal reference line perpendicular to a front direction of the vehicle on a horizontal plane parallel to a road surface; and determining a heading angle difference between the vehicle and the target object based on the gradient of the horizontal reference line.

12. The method of claim 11, wherein detecting the horizontal reference line includes detecting the horizontal reference line perpendicular to a front direction of the target object.

13. The method of claim 12, wherein detecting the horizontal reference line includes:

determining a first reference point and a second reference point on the horizontal reference line, the first reference point and the second reference point being randomly determined; and obtaining first image coordinates indicating a position of the first reference point and second image coordinates indicating a position of the second reference point, in an image coordinate system.

14. The method of claim 13, wherein calculating the gradient of the horizontal reference line includes:

obtaining first stereoscopic coordinates indicating the position of the first reference point and second stereoscopic coordinates indicating the position of the second reference point, in a world coordinate system, based on the first image coordinates and the second image coordinates; and determining a gradient of a straight line connecting the first stereoscopic coordinates and the second stereoscopic coordinates on the horizontal plane.

15. The method of claim 14, wherein obtaining the first stereoscopic coordinates and the second stereoscopic coordinates includes using a homography image matching method.

16. The method of claim 14, wherein calculating the gradient of the horizontal reference line includes:

determining a distance difference between the first stereoscopic coordinates and the second stereoscopic coordinates on a horizontal axis perpendicular to a reference axis indicating the front direction of the vehicle;

determining a depth difference between the first stereoscopic coordinates and the second stereoscopic coordinates; and determining the gradient of the horizontal reference line based on the distance difference and the depth difference.

17. The method of claim 16, wherein calculating the depth difference includes calculating a depth of each of the first stereoscopic coordinates and the second stereoscopic coordinates based on an actual length of the horizontal reference line, a focal length, and a length of the horizontal reference line in the image coordinate system.

18. The method of claim 16, wherein calculating the depth difference includes:

recognizing a license plate of the target object;

detecting a horizontal side corresponding to the horizontal reference line in the license plate; and determining a length of the horizontal side of the license plate based on an aspect ratio of the license plate.

19. The method of claim 14, wherein calculating the heading angle difference between the vehicle and the target object includes:

determining a gradient of a reference vector indicating the front direction of the target object on the horizontal plane;

determining an interior angle between a horizontal axis and the reference vector based on the gradient of the reference vector; and determining the heading angle difference between a reference axis and the reference vector based on the interior angle.

20. The method of claim 19, wherein calculating the gradient of the reference vector includes determining the gradient of the horizontal reference line on the horizontal plane; and obtaining the gradient of the reference vector by calculating a gradient orthogonal to the gradient of the horizontal reference line.

* * * * *